US006458896B1

(12) United States Patent
Collette et al.

(10) Patent No.: US 6,458,896 B1
(45) Date of Patent: Oct. 1, 2002

(54) SUPERABSORBENT POWDERS OF HIGH ABSORPTION AND HIGH CAPILLARY SUCTION

(75) Inventors: Christian Collette, Paris; Manuel Hidalgo, Bois-Colombes; Andre Kowalik, Govieux; Fabienne Lebendenko, Cauffry; Emmanuel Puchois, Paris, all of (FR)

(73) Assignee: Elf Atochem, S.A., Puteaux (FR)

( * ) Notice: Subject to any disclaimer, the term of this patent is extended or adjusted under 35 U.S.C. 154(b) by 0 days.

(21) Appl. No.: 09/180,524

(22) PCT Filed: Apr. 30, 1997

(86) PCT No.: PCT/FR97/00769

§ 371 (c)(1),
(2), (4) Date: May 21, 1999

(87) PCT Pub. No.: WO97/43331

PCT Pub. Date: Nov. 20, 1997

(30) Foreign Application Priority Data

May 9, 1996 (FR) .............................................. 96/05795

(51) Int. Cl.⁷ ................................................. C08F 4/00
(52) U.S. Cl. ........................ 525/267; 525/243; 525/252; 526/66; 526/73; 526/303.1; 526/317.1; 526/318.3; 526/320

(58) Field of Search ............................... 526/317.1, 240, 526/318.3, 320, 66, 73, 303.1; 525/70, 243, 252, 267, 344

(56) References Cited

U.S. PATENT DOCUMENTS

| 4,914,170 | A | * | 4/1990 | Chang et al. ................ 256/240 |
| 5,128,082 | A | * | 7/1992 | Makoui ....................... 264/112 |
| 5,180,798 | A | | 1/1993 | Nakamura et al. |
| 5,563,218 | A | | 10/1996 | Rebre et al. |
| 5,652,309 | A | * | 7/1997 | Itoch et al. .................. 525/243 |
| 5,807,916 | A | * | 9/1998 | Collete et al. ............... 524/364 |
| 5,976,696 | A | * | 11/1999 | Collete et al. ............... 428/407 |

FOREIGN PATENT DOCUMENTS

| EP | 258120 | | 3/1988 |
| EP | 441507 | | 8/1991 |
| EP | 0574248 | * | 12/1993 |
| EP | 644211 | | 3/1995 |

* cited by examiner

*Primary Examiner*—David W. Wu
*Assistant Examiner*—Tanya Zalukaeva
(74) *Attorney, Agent, or Firm*—Smith, Gambrell & Russell, LLP

(57) ABSTRACT

Certain mixtures of two superabsorbent powders having very different capillary suctions exhibit a resulting capillary suction which approaches the higher value. The resulting mixtures simultaneously exhibit a high capillary suction and a high intrinsic absorption capacity.

4 Claims, 1 Drawing Sheet

SUPERABSORBENT POWDERS OF HIGH ABSORPTION AND HIGH CAPILLARY SUCTION

FIELD OF THE INVENTION

Figure 1:
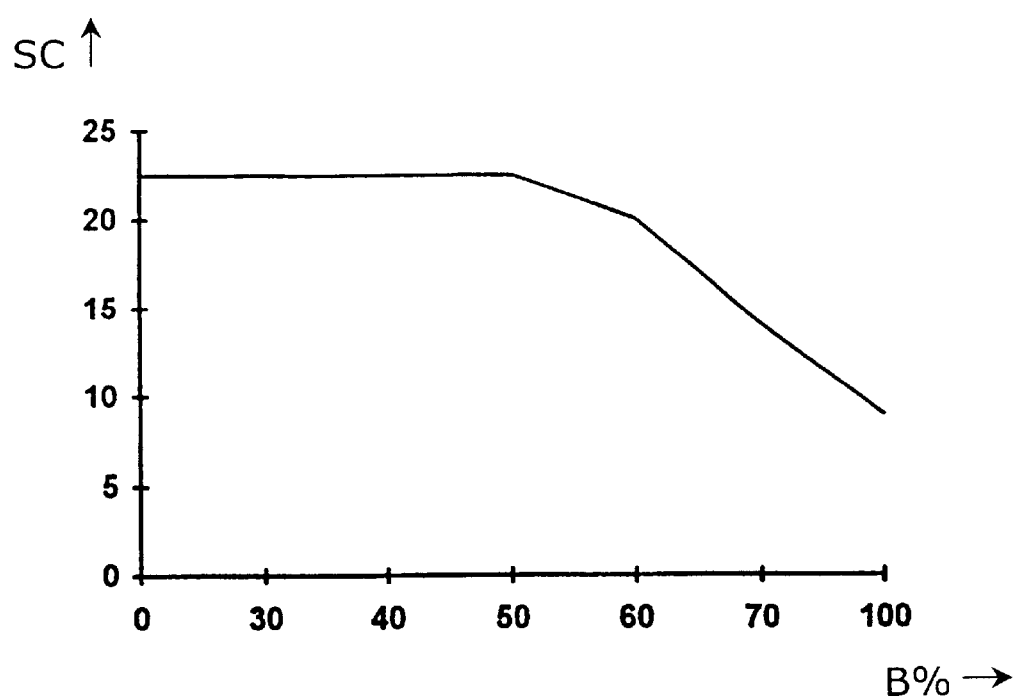

The present invention relates to the field of superabsorbent powders for the absorption of aqueous fluids which are of value in particular for the preparation of articles of hygiene intended to retain body fluids.

BACKGROUND OF THE INVENTION

These powders, which are experiencing very rapid industrial development, are characterized, for their application, by three main types of properties: their absorption properties, the mechanical properties of the gels which they form by absorption of aqueous fluids, and what may be called the transportation properties of these gels.

The absorption properties, the advantage of which is immediately obvious in the case of absorbent products and even more so superabsorbent products, are essentially the intrinsic absorption and retention capacities, for example for saline water, and the gel setting time.

The mechanical properties of the aqueous superabsorbent gels are related to the need for articles of hygiene to be able to absorb aqueous fluids when they are in a situation of compression or simply when they contain a large amount of superabsorbent powder. In this instance, there has been particular interest in systems with a high concentration of superabsorbent powder which exhibit a high capillary suction capacity under pressure.

The transportation properties of the superabsorbent gel are related to the ability of the fluids to diffuse rapidly into the superabsorbent and not to be blocked by the gel which is formed on first contact (gel blocking). These blocking phenomena are reflected by leakages of liquids which have not succeeded in crossing a gel barrier. The importance of them is estimated by measuring the porosity under certain conditions of pressure and of impregnation of the superabsorbent by the aqueous fluid. This porosity is obviously dependent on the geometry (particle size) of the powder but also on the mechanical properties of the gel, it being understood that impermeability can be an unfortunate consequence of the crushing of the gel. This is the reason why, in assessing the transportation properties of the gel, the porosity and the mechanical modulus of the superabsorbent gel are often taken for each other, the latter also being related to the capillary suction mentioned above.

In order to assess these properties, the measurements indicated below are usually carried out.

The intrinsic absorption capacity of the superabsorbent resin is obtained by the so-called "tea-bag" test (measurement of the absorption and retention capacities by the "tea-bag" method, EDANA, European Association of Nonwovens), by which test the water uptake is measured by weight with respect to the weight of a dry resin enclosed in a heat-sealable paper bag, after immersion for about 20 minutes in an aqueous solution containing 0.9% of sodium chloride and draining for about ten minutes; the same bag is subsequently centrifuged for three minutes at a specified speed and weighed again, which gives the saline water retention capacity.

The capillary suction capacity under pressure (CS) is the measurement of the ability of a bed of 1.5 g of superabsorbent product to absorb water containing 0.9 g of salt per liter under a load, here chosen as 5 kPa. This is a well-known property, designated under the terms capillary absorption or suction under pressure or under load (the term "absorption under load", shortened to AUL, is frequently encountered). The procedure thereof is universally practised. A description of it will be found, for example, in Patent Application EP-A1-0,258,120.

In order to measure the porosity of a bed of gel, 4 g of superabsorbent resin are swollen with 140 g of a 0.9% by weight aqueous sodium chloride solution. The gel formed is placed in a container with a diameter of 52 mm and a height of 55 mm. The container is subsequently connected to the line of a tank containing the saline solution (0.9% NaCl) and the amount of solution which manages to pass through the gel is continuously weighed. The pressure of the liquid passing through the bed (2.5 kPa) is kept constant by controlling the level of the feed tank. The mass of solution collected after 10 minutes is regarded as a measure of the porosity of the gel.

The gel setting time is measured as follows. 3 g of superabsorbent powder are poured into a 250 ml beaker with an external diameter of 60 mm. A magnetic stirrer with dimensions 48×8 mm is placed inside the beaker and the entire assembly is placed on a magnetic stirrer plate. Stirring is adjusted to 600 revolutions per minute immediately before pouring 100 ml of an aqueous solution containing 0.9% of salt into the beaker and simultaneously starting a stopwatch. The latter is stopped at the moment when the stirring vortex disappears. The time in seconds shown by the stopwatch corresponds to the gel setting time of the product.

The problem posed to the person skilled in the art is that absorption and mechanical properties are conflicting quantities and that any attempt to increase, by synthesis, the intrinsic absorption capacity level of superabsorbent polymers results in a decline in the mechanical properties, in particular in the capillary suction. The preparation of a superabsorbent powder exhibiting simultaneously a high intrinsic absorption capacity, a high retention, a high capillary suction, a high porosity and a short gel setting time, appears as an impossible compromise, which there is no hope of achieving either by direct synthesis or by formulation, since it would clearly be expected that a mixture of powders with different properties would only correspond to a product with mediocre intermediate properties.

DESCRIPTION OF THE INVENTION BRIEF DESCRIPTION OF THE DRAWING

Now, it has just been found, which is most unexpected and the consequences of which are made use of in the present invention, that certain mixtures of two superabsorbent powders with very different capillary suctions exhibit a resulting capillary suction close to the higher capillary suction (see FIG. 1). The invention thus lies in a process for obtaining a superabsorbent powder, which simultaneously exhibits a high capillary suction and a high intrinsic absorption capacity, which consists in mixing, in reasonable proportions, a superabsorbent powder of high intrinsic absorption capacity but low capillary suction with a superabsorbent powder exhibiting, in contrast, a high capillary suction (high modulus) and a lower intrinsic absorption capacity.

More specifically, in order to obtain an absorbent powder exhibiting the set of following characteristics, intrinsic absorption capacity of greater than 53 g/g, retention of between 25 and 35 g/g, capillary suction (5 kPa, 1.5 g of resin) of greater than 20 g/g, porosity of between 50 and 800 g, gel setting time of between 100 and 200 seconds, a superabsorbent powder of high capillary suction, the characteristics of which are within the following limits:

intrinsic absorption capacity of less than 55 g/g, retention of between 21 and 29 g/g, capillary suction (5 kPa, 1.5 g of resin) of greater than 21 g/g, porosity of greater than 1000, gel setting time of between 120 and 230 seconds, is mixed, in proportions by weight ranging from 25:75 to 60:40, with a superabsorbent powder of high intrinsic absorption capacity, the characteristics of which are within the following limits:

intrinsic absorption capacity of greater than 62 g/g, retention of between 32 and 36 g/g, capillary suction (5 kPa, 1.5 g of resin) of between 8 and 12 g/g, porosity of less than 20 g, gel setting time of between 90 and 120 seconds.

It will be noted that the powders thus obtained exhibit characteristics which have not yet been encountered and that these are therefore also subject-matters of the invention.

More particularly, the powders according to the invention are composed of beads of polymers, resulting from the inverse suspension polymerization of an ethylenically unsaturated hydrophilic monomer, in practice a partially salified and partially crosslinked acrylic acid, with a particle size of between 0.1 and 1 mm. It can be highly advantageous to use, as powder of high capillary suction, a superabsorbent powder of core-shell structure resulting from an inverse suspension polymerization, followed by postcrosslinking under conditions of water content with respect to the anhydrous polymer at the time of the postcrosslinking of between 0.3 and 0.50, as well as a minimum amount of postcrosslinking agent of 500 ppm with respect to the anhydrous polymer, such as that powder whose method of preparation has been disclosed in French Application No. 96 01502, the characteristics of which are within the following limits:

intrinsic absorption capacity of between 50 and 57 g/g, retention of between 22 and 27 g/g, capillary suction (5 kPa, 1.5 g of resin) of at least 20 g/g, porosity of at least 1000 g, gel setting time of between 130 and 230 seconds.

The following example will enable the invention to be understood more clearly.

Two superabsorbent powders are mixed in various proportions. One, Powder A, is a polyacrylic superabsorbent powder of core-shell structure with a high capillary suction but a rather low intrinsic absorption capacity; the other, Powder B, is a conventional polyacrylic superabsorbent powder with a good intrinsic absorption capacity but a relatively low capillary suction.

Powder A was prepared, in accordance with the teaching of Patent Application No. 96 01502, in the following way. A solution of a surfactant of low HLB (<6) in heptane is introduced into a stirred reactor equipped with a jacket through which circulates a heat-transfer fluid at a set temperature. The solution is heated (80° C.) and an aqueous solution of acrylic monomers (39% by weight), namely acrylic acid neutralized to 75 mol % with sodium hydroxide, which solution is prepared beforehand and additionally contains potassium persulphate, as polymerization initiator, carboxymethylcellulose, as thickener, and ethylene glycol diglycidyl ether, as crosslinking agent, is then added, so as to obtain, with the help of the stirring, a dispersion (which is known as the inverse suspension). The system is allowed to polymerize by maintaining it at the set temperature at 70° C. The polymerization of this first charge being virtually complete, a second solution (39% by weight) of acrylic acid neutralized to 75% with sodium hydroxide, containing, in addition to the ingredients mentioned for the first charge, an agglomerating hydrophilic surfactant of high HLB (>15), such as those mentioned in French Patent Application No. 95 04325, of which nonylphenol ethoxylated with 50 mol of ethylene oxide is an example, is introduced dropwise (in order to avoid a significant fall in the temperature of the reactor); the stirring is also gradually increased. At the same time as the polymerization of the second charge, agglomeration of the polymer particles takes place. When the second polymerization has reached completion, a portion of the water is removed from the system by raising the temperature to that of the boiling point of the water/heptane azeotrope. Water is drawn from the system until the ratio by weight of the remaining water to the anhydrous polymer (WTAR) is equal to 0.4 and, at this point, 900 ppm (with respect to the total anhydrous polymer) of ethylene glycol diglycidyl ether, as postcrosslinking agent, are introduced into the system. The processing is continued by a drying stage, during which the remaining water and heptane are drawn off. The resulting product is a powder composed of agglomerates of spherical particles, 85% by weight of which are found in the 0.1–1 mm particle size range and less than 1% of which pass through the 0.1 mm sieve.

Powder B was prepared, in accordance with the teaching of Patent Application EP-A-441,507 (Sumitomo), in the following way. A solution of a surfactant of low HLB (<6) in heptane is introduced into a stirred reactor equipped with a jacket through which circulates a heat-transfer fluid at a set temperature. The solution is brought to thermal equilibrium at 55–60° C. and an aqueous solution of acrylic monomers (39% by weight), namely acrylic acid neutralized to 75% with sodium hydroxide, which solution is prepared beforehand and additionally contains potassium persulphate, as polymerization initiator, carboxymethylcellulose, as thickener, and ethylene glycol diglycidyl ether, as crosslinking agent, is then added, so as to obtain, with stirring, an inverse suspension. The temperature of this suspension is adjusted to 35–40° C. Polymerization is brought about by raising the temperature of the heat-exchange fluid to a set value of 70° C. The polymerization of this first charge being virtually complete, the temperature is lowered to 20° C. while greatly increasing the stirring speed. A second solution (39% by weight) of an acrylic acid neutralized to 75 mol % with sodium hydroxide, which solution contains, in addition to the monomers, potassium persulphate, as polymerization initiator, and ethylene glycol diglycidyl ether, as crosslinking agent, is then introduced dropwise (note here the intentional absence of thickener), which brings about the swelling and the agglomeration of the particles of polymers in suspension. The system is then reheated by bringing the set temperature to 70° C., which brings about the polymerization of the second charge of monomers. When the second polymerization has arrived at completion, a portion of the water is removed from the system by bringing it to the boiling temperature of the water/heptane azeotrope. The water is drawn from the system until the ratio by weight of the remaining water to the anhydrous polymer (WTAR) is equal to 0.2 and, at this point, 250 ppm (with respect to the total anhydrous polymer) of ethylene glycol diglycidyl ether, as postcrosslinking agent, are introduced into the system. The processing is continued by a drying stage, during which the remaining water and heptane are drawn off. The resulting product is a powder composed of agglomerates of spherical particles, 85% by weight of which are found in the 0.1–1 mm particle size range and less than 1% of which pass through the 0.1 mm sieve.

The properties of the components and of their mixtures-in variable proportions are collated in the table below.

| B/A mixture | Absorption | Retention | CS (5 kPa) | Porosity | Gel setting time |
|---|---|---|---|---|---|
| 0/100 | 51 | 24 | 22.5 | 1000 | 200 |
| 25/75 | 55 | 26 | 22.5 | | 170 |
| 30/70 | 55 | 27 | 22.5 | | 160 |
| 40/50 | 55 | 28 | 22.5 | | 150 |
| 50/50 | 60 | 29 | 22.5 | 100 | 140 |
| 60/40 | 61 | 29.5 | 20 | | 130 |
| 70/30 | 61 | 30 | 14 | | 120 |
| 100/0 | 66 | 34 | 9 | 1 | 109 |

It is found that, by mixing these two powders in the ratios 25:75–60:40 of the invention, a superabsorbent is prepared without any difficulty which is characterized by the set of highly advantageous properties, which is inaccessible by direct access:

high intrinsic absorption capacity (>55), retention of between 25 and 35 g/g, high capillary suction under 5 kPa (>20), porosity of between 50 and 800 g, gel setting time <170 seconds.

If attention is turned to the change in the capillary suction as a function of the proportion of the component B with the poorer capillary suction characteristic, the highly characteristic curve presented in FIG. 1 is obtained, with a capillary suction stationary phase for mixtures assaying up to 50% of the component B.

The superabsorbent powders according to the invention can be used in all fields open to powders of the prior art and in particular in articles of hygiene. They are particularly valued for the production of ultrathin nappies incorporating high proportions of superabsorbent product.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A superabsorbent powder for absorbing aqueous fluids, having the following properties:

an intrinsic absorption capacity of greater than 53 g/g;

a retention of between 25 and 35 g/g;

a capillary suction (5 kPa, 1.5 g of resin) of greater than 20 g/g;

a porosity of between 50 and 800 g; and a gel setting time of between 100 and 200 seconds;

wherein the powder is prepared by a method comprising:

providing a first powder, in an amount by weight ranging from 50 to 60% of the resulting superabsorbent powder, having the following characteristics:

an intrinsic absorption capacity of less than 55 g/g;

a retention of between 21 and 29 g/g;

a capillary suction (5 kPa, 1.5 g of resin) of greater than 21 g/g;

a porosity of greater than 1000 g; and a gel setting time of between 120 and 230 seconds;

providing a second powder, in an amount by weight ranging from 50 to 40% of the resulting superabsorbent powder, having the following characteristics:

an intrinsic absorption capacity of greater than 62 g/g;

a retention of between 32 and 36 g/g;

a capillary suction (5 kPa, 1.5 g of resin) of between 8 and 12 g/g;

a porosity of less than 20 g; and a gel setting time of between 90 and 120 seconds; and mixing the first and the second powders to thereby obtain the superabsorbent powder;

wherein the first powder comprises:

an acrylic acid polymer powder which results from an inverse suspension polymerization, followed by postcrosslinking under conditions of water content with respect to the anhydrous polymer at the time of the postcrosslinking of between 0.3 and 0.5; and an amount of postcrosslinking agent of at least 500 ppm with respect to the anhydrous polymer;

further wherein the second powder comprises beads of polymers which result from an inverse suspension polymerization of an ethylenically unsaturated hydrophilic monomer;

further wherein the first and second powders have a particle size of between 0.1 and 1 mm.

2. An article of hygiene comprising an effective amount of the superabsorbent powder according to claim 1.

3. A superabsorbent powder for absorbing aqueous fluids, having the following properties:

an intrinsic absorption capacity of greater than 53 g/g;

a capillary suction (5 kPa, 1.5 g of resin) of greater than 20 g/g;

a porosity of between 50 and 800 g; and a gel setting time of between 100 and 200 seconds;

wherein the powder is prepared by a method comprising:

providing a first powder, in an amount by weight ranging from 50 to 60% of the resulting superabsorbent powder, having the following characteristics:

an intrinsic absorption capacity of less than 55 g/g;

a capillary suction (5 kPa, 1.5 g of resin) of greater than 21 g/g;

a porosity of greater than 1000 g; and a gel setting time of between 120 and 230 seconds;

providing a second powder, in an amount by weight ranging from 50 to 40% of the resulting superabsorbent powder, having the following characteristics:

an intrinsic absorption capacity of greater than 62 g/g;

a capillary suction (5 kPa, 1.5 g of resin) of between 8 and 12 g/g;

a porosity of less than 20 g; and a gel setting time of between 90 and 120 seconds; and mixing the first and the second powders to thereby obtain the superabsorbent powder;

wherein the first powder comprises:

an acrylic acid polymer powder which results from an inverse suspension polymerization, followed by postcrosslinking under conditions of water content with respect to the anhydrous polymer at the time of the postcrosslinking of between 0.3 and 0.5; and an amount of postcrosslinking agent of at least 500 ppm with respect to the anhydrous polymer;

further wherein the second powder comprises beads of polymers which result from an inverse suspension polymerization of an ethylenically unsaturated hydrophilic monomer;

further wherein the first and second powders have a particle size of between 0.1 and 1 mm.

4. An article of hygiene comprising an effective amount of the superabsorbent powder according to claim 3.

* * * * *